United States Patent
Mitchell

(10) Patent No.: US 7,185,906 B2
(45) Date of Patent: Mar. 6, 2007

(54) FIFTH WHEEL COUPLING FOR A TOWING VEHICLE

(76) Inventor: Herman R. Mitchell, 4930 Strathaven Dr., Dayton, OH (US) 45424

( * ) Notice: Subject to any disclaimer, the term of this patent is extended or adjusted under 35 U.S.C. 154(b) by 369 days.

(21) Appl. No.: 10/800,507

(22) Filed: Mar. 15, 2004

(65) Prior Publication Data

US 2005/0098367 A1    May 12, 2005

Related U.S. Application Data

(63) Continuation-in-part of application No. 10/702,715, filed on Nov. 6, 2003.

(51) Int. Cl.
*B62D 53/06* (2006.01)
(52) U.S. Cl. .................................... 280/439
(58) Field of Classification Search ............... 280/433, 280/439, 441, 483, 438.1
See application file for complete search history.

(56) References Cited

U.S. PATENT DOCUMENTS

| | | | | |
|---|---|---|---|---|
| 2,809,851 A * | 10/1957 | Beck | ........................ | 280/438.1 |
| 2,958,542 A * | 11/1960 | Janeway | .................. | 280/438.1 |
| 3,073,624 A * | 1/1963 | Thomas | .................... | 280/438.1 |
| 3,122,382 A * | 2/1964 | Carrier | ..................... | 280/438.1 |
| 3,203,712 A * | 8/1965 | Lorrin | ...................... | 280/438.1 |
| 3,360,280 A * | 12/1967 | Betchart | ..................... | 280/407 |
| 3,869,147 A * | 3/1975 | Fry | .......................... | 280/438.1 |
| 4,444,408 A * | 4/1984 | Goth | ........................ | 280/438.1 |
| 5,851,021 A * | 12/1998 | Van Kley | ................ | 280/438.1 |
| 6,913,276 B1 * | 7/2005 | Bauder | ........................ | 280/483 |
| 7,125,034 B2 * | 10/2006 | Winckler | ................. | 280/438.1 |
| 2004/0169348 A1 * | 9/2004 | Winckler | ................. | 280/425.2 |

* cited by examiner

*Primary Examiner*—David R. Dunn
*Assistant Examiner*—Leonard McCreary, Jr.
(74) *Attorney, Agent, or Firm*—Mark A. Navarre

(57) ABSTRACT

A fifth wheel coupling includes a receiver that is suspended from the frame of a towing vehicle by a linkage mechanism to permit limited relative longitudinal and vertical displacement of the towing vehicle and a towed vehicle. The receiver is mounted on a wishbone bracket that straddles the frame of the towing vehicle, and swinging linkage members couple the wishbone bracket to the frame. Initial forward movement of the tractor produces rotation of the linkage members with respect to the frame without producing forward movement of the towed vehicle. The rotation of the linkage members slightly elevates the receiver, whereafter the towed vehicle and receiver follow the towing vehicle in a swinging motion as the effects of gravity overcome the rolling resistance of the towed vehicle and its load.

3 Claims, 3 Drawing Sheets

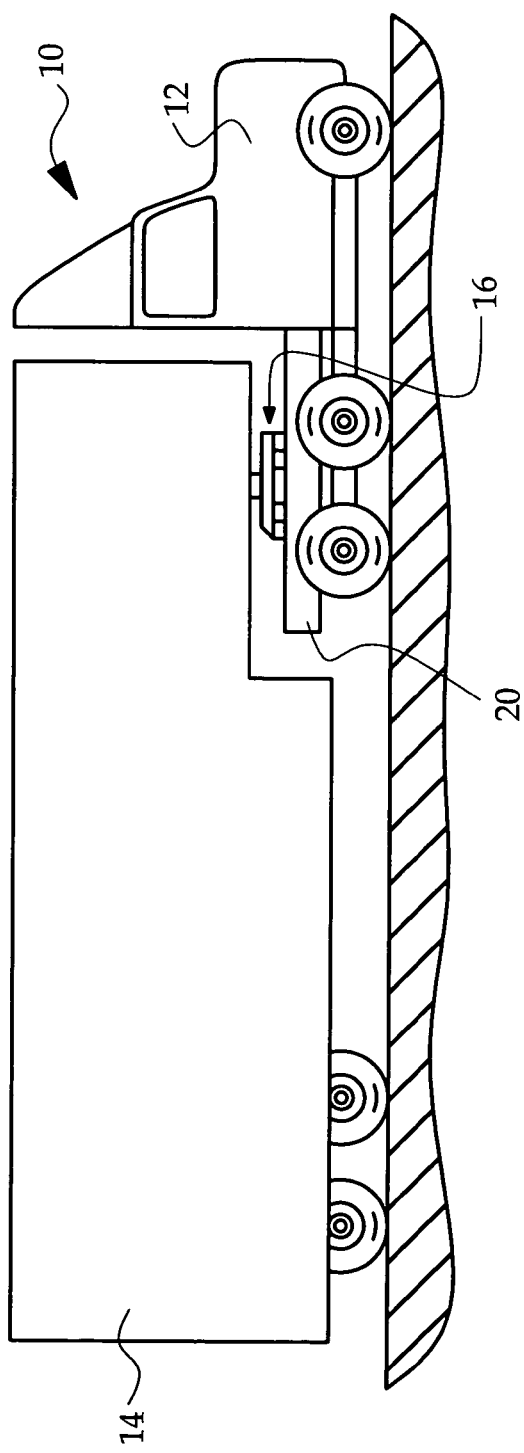
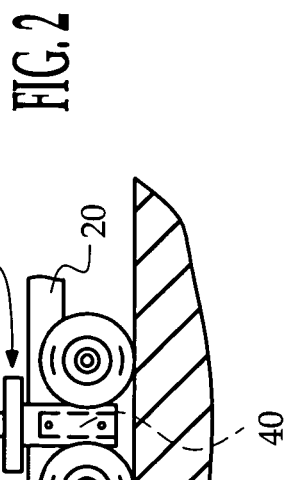

FIFTH WHEEL COUPLING FOR A TOWING VEHICLE

RELATED APPLICATIONS

This application is a continuation-in-part of co-pending U.S. patent application Ser. No. 10/702,715, filed on Nov. 6, 2003.

TECHNICAL FIELD

The present invention relates to a fifth wheel coupling for connecting a towing vehicle such as a semi-tractor to a towed vehicle such as a trailer, and more particularly to a fifth wheel coupling that reduces the effort required to move the towed vehicle.

BACKGROUND OF THE INVENTION

In conventional practice a semi-tractor is drivingly connected to a trailer with a fifth wheel coupling including a kingpin attached to the trailer and a receiver that is bolted to the frame of the semi-tractor. The coupling is semi-rigid with limited lost motion, and the tractor essentially must have sufficient power to initiate movement of the entire weight of the trailer and load. Various efforts have been made in the transportation industry to improve energy conversion efficiency and reduce frictional losses such as rolling resistance, but the improvements continue to be incremental in nature, and the overall rates of fuel consumption and combustion emission production remain unacceptably high. Accordingly, what is needed is a semi-tractor/trailer load coupling that allows the tractor to initiate movement of the trailer and its load with reduced effort, leading to corresponding reductions in fuel consumption and combustion emission production.

SUMMARY OF THE INVENTION

The present invention is directed to a new and improved fifth wheel coupling, where the fifth wheel receiver is attached to the frame of the towing vehicle by a linkage mechanism that permits limited longitudinal and vertical displacement of the towing vehicle and the towed vehicle. The receiver is mounted on a wishbone bracket that straddles the frame of the towing vehicle, and swinging linkage members couple the wishbone bracket to the frame. Initial forward movement of the towing vehicle produces rotation of the linkage members with respect to the towing vehicle frame without producing forward movement of the receiver or the towed vehicle. The rotation of the linkage members slightly elevates the receiver, whereafter the towed vehicle and receiver follow the towing vehicle in a swinging motion as the effects of gravity overcome the rolling resistance of the towed vehicle and its load.

The effort required to initiate movement of the towed vehicle is significantly reduced due to the relative displacement of the towing vehicle and the towed vehicle. Once in motion, the towed vehicle continues to follow the towing vehicle in the direction of travel, providing continued reduction in motive effort even when the vehicles reach a constant forward speed. Similar operation is achieved when the towing vehicle is operated in reverse.

BRIEF DESCRIPTION OF THE DRAWINGS

The present invention will now be described, by way of example, with reference to the accompanying drawings, in which:

FIG. 1 is a side-view of a semi-tractor/trailer and a prior art fifth wheel coupling.

FIG. 2 is a partial side-view of a semi-tractor/trailer and a fifth wheel coupling according to this invention.

FIG. 4 depicts the fifth wheel coupling in a rest state; FIG. 5 depicts the fifth wheel coupling upon initial forward movement of the semi-tractor without accompanying forward movement of the trailer; and FIG. 6 depicts the fifth wheel coupling when the trailer has also achieved forward movement.

DESCRIPTION OF THE PREFERRED EMBODIMENT

Figure 3:
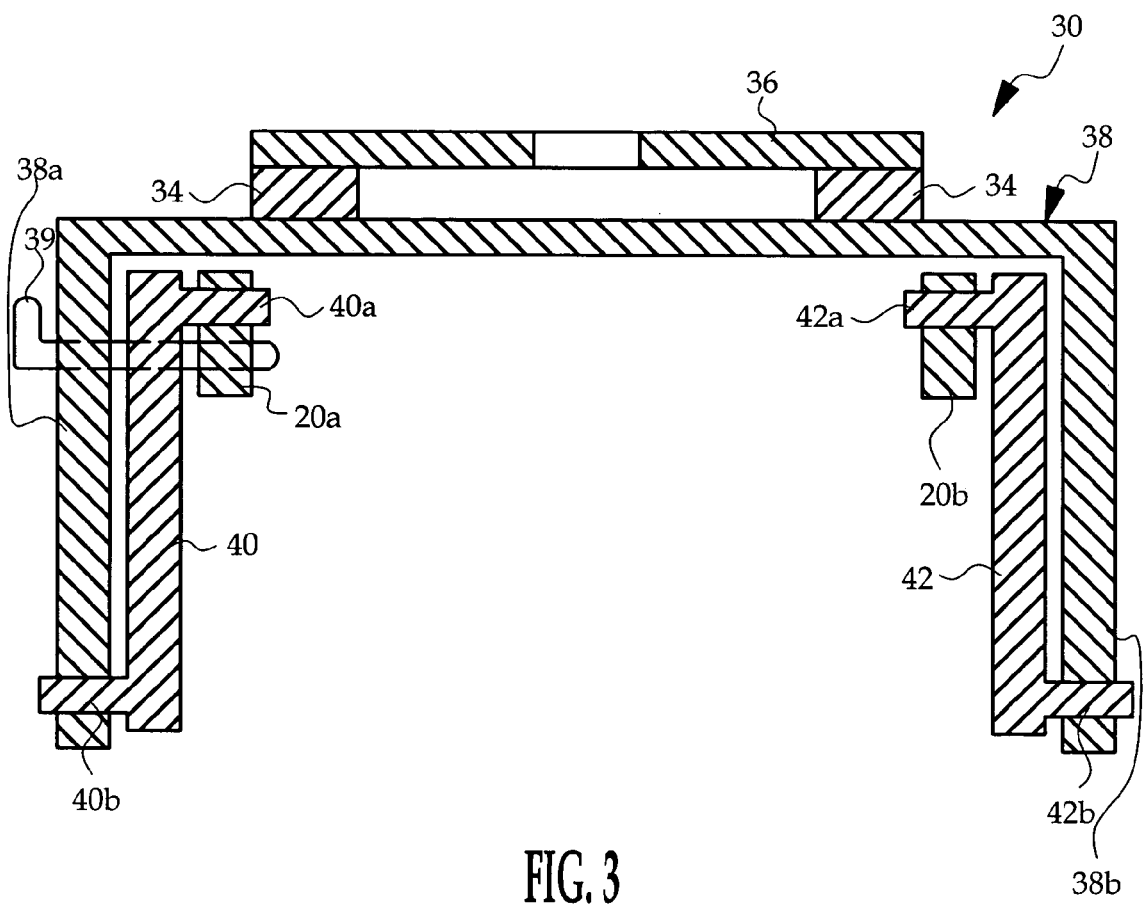
FIG. 3 is a cross-sectional view of the receiver portion of the fifth wheel coupling of FIG. 2.

The present invention is described herein primarily in the context of roadway vehicles, and particularly semi-tractor-trailers. However, it will be understood that the invention is also directly applicable to so-called gooseneck hitches and to hitches for certain off-road and construction vehicles, for example. In generic terms, the semi-tractor described herein may be referred to as a towing vehicle, and the trailer described herein may be referred to as a towed vehicle.

Referring to FIG. 1 of the drawings, the reference numeral 10 generally designates a semi-tractor/trailer. The tractor 12 is coupled to the trailer 14 with a prior art fifth wheel coupling, generally designated by the reference numeral 16. The fifth wheel coupling 16 includes a receiver 18 attached to the frame 20 of the tractor 12 and a kingpin 22 attached to the trailer 14. The receiver 18 includes a base 24 that is bolted to the tractor frame 20 and a plate 26 pivotally coupled to the base 24. The plate 26 is longitudinally slotted from the rear to receive the kingpin 22, and a pin or other mechanism (not shown) is inserted through the base 24 to limit movement of the kingpin 22 within the slot of plate 26. The limited longitudinal movement or lost motion of the kingpin 22 and plate 26 is generally undesirable, and various arrangements have been devised for resiliently opposing the movement; see, for example, the U.S. Pat. No. 6,692,013 to Zebolsky et al.

As mentioned above, the prior art fifth wheel coupling 16 establishes an essentially rigid coupling between the tractor 12 and trailer 14, and the tractor 12 therefore must exert sufficient power to initiate movement of the entire weight of the trailer 14 and its load. In contrast, and referring to FIG. 2, the fifth wheel coupling 30 of the present invention is coupled the tractor frame 20 so as to intentionally permit limited relative longitudinal and vertical displacement of the tractor 12 and trailer 14. Like the prior art receiver 18, the receiver 32 of the fifth wheel coupling 30 includes a base 34 and a slotted plate 36 hinged on the base 34. However, the receiver base 34 is mounted on a wishbone bracket 38 that spans and straddles the left and right tractor frame members 20a, 20b, as best seen in the cross-sectional view of FIG. 3. The downwardly extending bracket arms 38a, 38b are pivotably supported at their lowermost points by a pair of linkage members 40, 42 that are also pivotably coupled to the frame members 20a, 20b. Referring to FIG. 3, the linkage member 40 is coupled to the frame member 20a by the pin 40a, and to the lower end of bracket arm 38a by the pin 40b. Likewise, the linkage member 42 is coupled to the frame member 20b by the pin 42a, and to the lower end of bracket arm 38b by the pin 42b. Thus, the trailer tongue weight, as well as the weight of the fifth wheel coupling 30 and the wishbone bracket 38, is suspended from the frame members 20a, 20b, allowing relative longitudinal and vertical displacement of the tractor frame 20 and the receiver 32 as the linkage members 40, 42 rotate about the pins 40a, 42a.

To facilitate coupling and un-coupling of the kingpin 22 from the receiver plate 36, a lock pin 39 may be used to temporarily lock one or both of the wishbone bracket arms 38a, 38b to the tractor frame 20, temporarily preventing fore-aft movement of the receiver 32.

Figure 4:
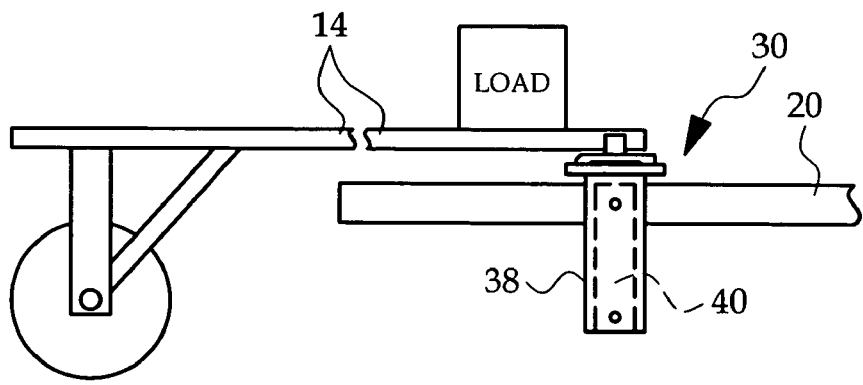
FIGS. 4–6 diagrammatically depict the operation of the fifth wheel coupling of FIGS. 2–3.
Figure 5:
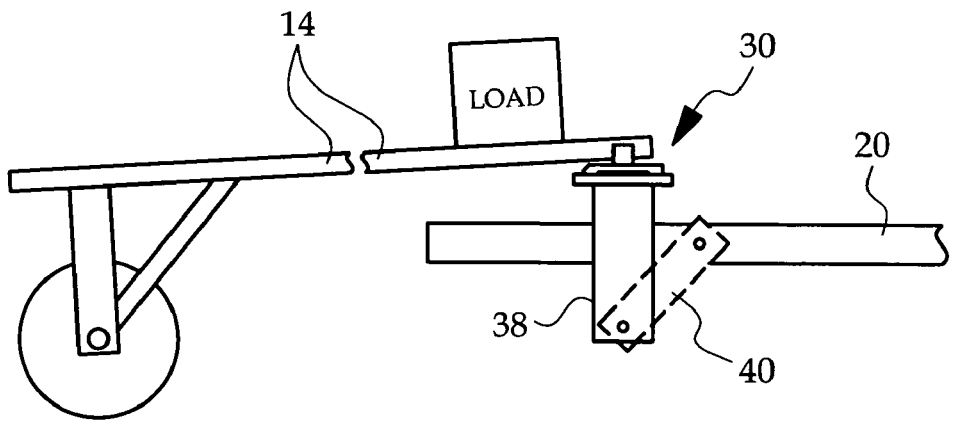
Figure 6:
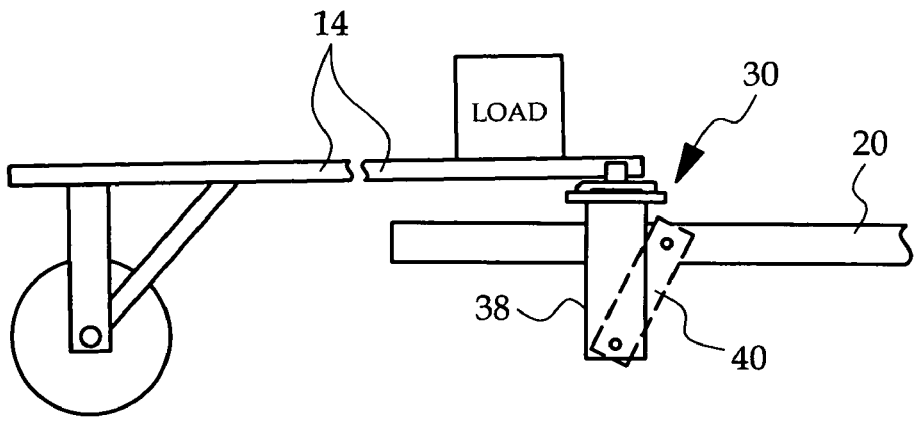

The operation of the invention is best illustrated by the stick diagrams of FIGS. 4–6. FIG. 4 illustrates the fifth wheel coupling 30 in the rest position depicted in FIG. 2. In this case, the linkage members 40 and 42 are parallel with the respective wishbone bracket arms 38a, 38b, and the linkage pins 40b, 42b are vertically aligned with the linkage pins 40a, 42a. FIG. 5 illustrates forward movement of the tractor frame 20, as the tractor 12 attempts to accelerate the trailer 14 from standstill. As illustrated in FIG. 5, initial forward movement of the tractor produces rotation of the linkage members 40, 42 about the pins 40a, 42a without producing forward movement of the trailer 14 or the receiver 32. The rotation of the linkage members 40, 42 slightly raises the fifth wheel coupling 30, and with it, the front of trailer 14. The wishbone bracket arms 38a, 38b concentrate the tongue weight of the trailer 14 and its load at the pins 40b, 42b, and this weight creates a restoring force for repositioning the pins 40b, 42b directly under the pins 40a, 42a. A forward component of this restoring force opposes the rolling resistance of the trailer 14, and the trailer 14 begins to move forward as illustrated in FIG. 6 when the forward force component overcomes the combined rolling resistance of the trailer 14 and its load. As the tractor 12 continues to move forward, the fifth wheel coupling 30 permits the trailer 14 and its load to track the frame 20 with reduced rotational displacement of the linkage members 40, 42. Of course, an equivalent but opposite rotational displacement of the linkage members 40, 42 occurs when the tractor 12 moves in reverse. If desired, a damper can be used to prevent or severely attenuate forward motion of the fifth wheel coupling 30 when the tractor 12 decelerates by application of the service brakes.

Due to the relative movement of the tractor 12 and trailer 14 and the consequent restoring force of the fifth wheel coupling 30, the effort required to initiate movement of the trailer 14 and its load is significantly reduced. Once in motion, the trailer 14 continues to follow the tractor 12 in the direction of travel, providing continued reduction in motive effort even when the tractor 12 and trailer 14 reach a constant forward speed.

In summary, the present invention provides an improved load coupling apparatus that significantly reduces the effort required to initiate and maintain movement of a semi-tractor/trailer. As a result, the peak motive power requirements are significantly reduced, contributing to substantial improvements in fuel economy and emissions, and lower initial powertrain expense. While the invention has been described in reference to the illustrated embodiments, it should be understood that various modifications in addition to those mentioned above will occur to persons skilled in the art. For example, the swinging linkage members 40, 42 may each be implemented with two or more parallel-mounted linkage members, the locking pin 39 may be implemented hydraulically or pneumatically, with either automatic or manual control, and so on. Accordingly, it will be understood that fifth wheel couplings incorporating these and other modifications may fall within the scope of this invention, which is defined by the appended claims.

The invention claimed is:

1. A fifth wheel coupling apparatus for connecting a towing vehicle to a towed vehicle, including a kingpin attached to the towed vehicle and a fifth-wheel receiver attached to the towing vehicle, the apparatus comprising:
    a wishbone bracket that spans a pair of frame members of said towing vehicle, including a central portion on which said fifth-wheel receiver is mounted and downwardly extending arms that straddle said frame members; and
    swinging linkage members disposed outboard of the frame members and pivotably coupled to said frame members and said downwardly extending arms of said wishbone bracket so as to permit limited longitudinal and vertical displacement of said receiver and kingpin with respect to said frame members as the towing vehicle initiates forward longitudinal movement, whereafter said receiver and trailer also experience forward longitudinal movement.

2. The apparatus of claim 1, wherein said frame members are supported by a set of tires, and said swinging linkage members and the downwardly extending arms of said wishbone bracket are disposed between said tires and said frame members.

3. The fifth-wheel coupling apparatus of claim 1, further comprising:
    a locking pin temporarily preventing longitudinal displacement of said receiver with respect to said frame members to facilitate coupling and uncoupling of said kingpin and said receiver.

* * * * *